United States Patent
Gupta et al.

(10) Patent No.: US 12,095,915 B2
(45) Date of Patent: Sep. 17, 2024

(54) METHOD AND APPARATUS FOR KEY MANAGEMENT IN MISSION CRITICAL DATA COMMUNICATION

(71) Applicant: Samsung Electronics Co., Ltd., Suwon-si (KR)

(72) Inventors: Nishant Gupta, Sitapur (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 17/426,782

(22) PCT Filed: Mar. 10, 2020

(86) PCT No.: PCT/KR2020/003301
§ 371 (c)(1),
(2) Date: Jul. 29, 2021

(87) PCT Pub. No.: WO2020/184949
PCT Pub. Date: Sep. 17, 2020

(65) Prior Publication Data
US 2022/0103357 A1 Mar. 31, 2022

(30) Foreign Application Priority Data
Mar. 11, 2019 (IN) .............................. 201941009427
Jan. 13, 2020 (IN) ............................ 2019 41009427

(51) Int. Cl.
*H04L 29/06* (2006.01)
*H04L 9/08* (2006.01)
*H04L 67/59* (2022.01)

(52) U.S. Cl.
CPC ............ *H04L 9/0894* (2013.01); *H04L 67/59* (2022.05)

(58) Field of Classification Search
CPC .............................. H04L 9/0894; H04L 67/59
See application file for complete search history.

(56) References Cited

U.S. PATENT DOCUMENTS

| | | | |
|---|---|---|---|
| 7,490,067 B1 * | 2/2009 | Huber | H04N 7/147 |
| | | | 705/50 |
| 2005/0038880 A1 * | 2/2005 | Danforth | H04L 67/34 |
| | | | 709/222 |

(Continued)

FOREIGN PATENT DOCUMENTS

| | | | | |
|---|---|---|---|---|
| CN | 106507346 B | * | 3/2020 | ............ H04W 12/04 |
| KR | 10-2018-0107776 A | | 10/2018 | |

(Continued)

OTHER PUBLICATIONS

Samsung et al.; pCR 33.880 MCData SDS security solution; 3GPP TSG SA WG3 (Security) Meeting #86; S3-170402; revision of S3-170101; Feb. 6-10, 2017; Sophia Antipolis (France); Feb. 10, 2017.

(Continued)

*Primary Examiner* — Shawnchoy Rahman
(74) *Attorney, Agent, or Firm* — Jefferson IP Law, LLP

(57) ABSTRACT

Provided are methods and apparatuses for off-network key management in one-to-one mission critical data communication. A method includes initiating an off-network MCData service for the communication with an other client device, obtaining a MCData message including a MCdata protection key and an identifier of the MCdata protection key, in case that a valid MCdata protection key for the other client device is not available, and transmitting the MCData message to the other client device.

13 Claims, 5 Drawing Sheets

(56) References Cited

U.S. PATENT DOCUMENTS

| | | | | |
|---|---|---|---|---|
| 2007/0254681 | A1* | 11/2007 | Horvath | H04W 4/14 455/466 |
| 2013/0124859 | A1* | 5/2013 | Pestoni | H04L 63/065 380/282 |
| 2016/0156593 | A1 | 6/2016 | Yan | |
| 2017/0006571 | A1 | 1/2017 | Allen et al. | |
| 2019/0007803 | A1 | 1/2019 | Sedlacek et al. | |

FOREIGN PATENT DOCUMENTS

| | | | | |
|---|---|---|---|---|
| WO | WO-2009042705 A1 * | 4/2009 | | H04L 9/083 |
| WO | 2018/048230 A1 | 3/2018 | | |
| WO | 2018/139910 A1 | 8/2018 | | |

OTHER PUBLICATIONS

Samsung et al.; pCR 33.180 MCData SDS security solution; 3GPP TSG SA WG3 (Security) Meeting #86; S3-170486; revision of S3-17wxyz; Feb. 6-10, 2017; Sophia Antipolis (France); Feb. 10, 2017.

3GPP; 3rd Generation Partnership Project; Technical Specification Group Services and System Aspects; Security of the Mission Critical Service; (Release 14); 3GPP TS 33.180; V0.1.0; Nov. 2016; Valbonne, France; Nov. 4, 2016.

Extended European Search Report dated Mar. 3, 2022; European Appln. No. 20769810.1-1218 / 3928489 PCT/KR2020003301.

Indian Office Action dated Apr. 12, 2021; Indian Appln. No. 201941009427.

'3GPP; Technical Specification Group Core Network and Terminals; Mission Critical Systems Connection to LMR; (Release 16)', 3GPP TR 24.883 V0.7.0, Mar. 1, 2019.

'3GPP; Technical Specification Group Radio Access Network; Mission Critical (MC) services over LTE; Part 6: Mission Critical Data (MCData) User Equipment (UE) Protocol conformance specification (Release 14)', 3GPP TS 36.579-7 V0.0.5, Mar. 7, 2019.

3GPP, 3rd Generation Partnership Project, Technical Specification Group Services and System Aspects, Security of the mission critical service, (Release 14), 3GPP TS 33.180 V14.5.0, Sep. 2018.

3GPP, 3rd Generation Partnership Project, Technical Specification Group Services and System Aspects, Security of the mission critical service, (Release 15), 3GPP TS 33.180 V15.3.0, Sep. 2018.

Chinese Office Action dated Oct. 28, 2023, issued in Chinese Application No. 202080020223.8.

Chinese Office Action dated Aug. 1, 2024, issued in Chinese Application No. 202080020223.8.

* cited by examiner

[Fig. 1]
[Fig. 2]
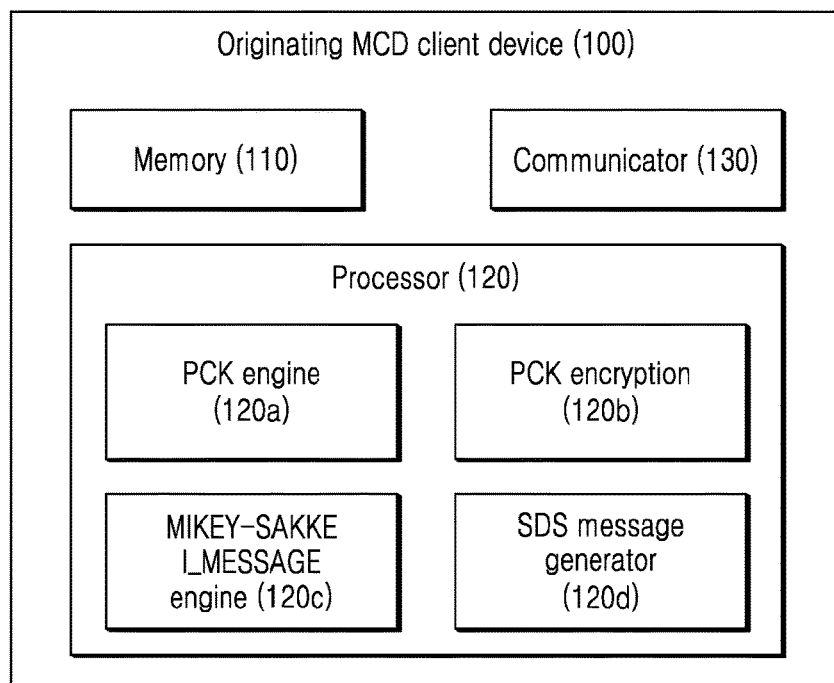
[Fig. 3]
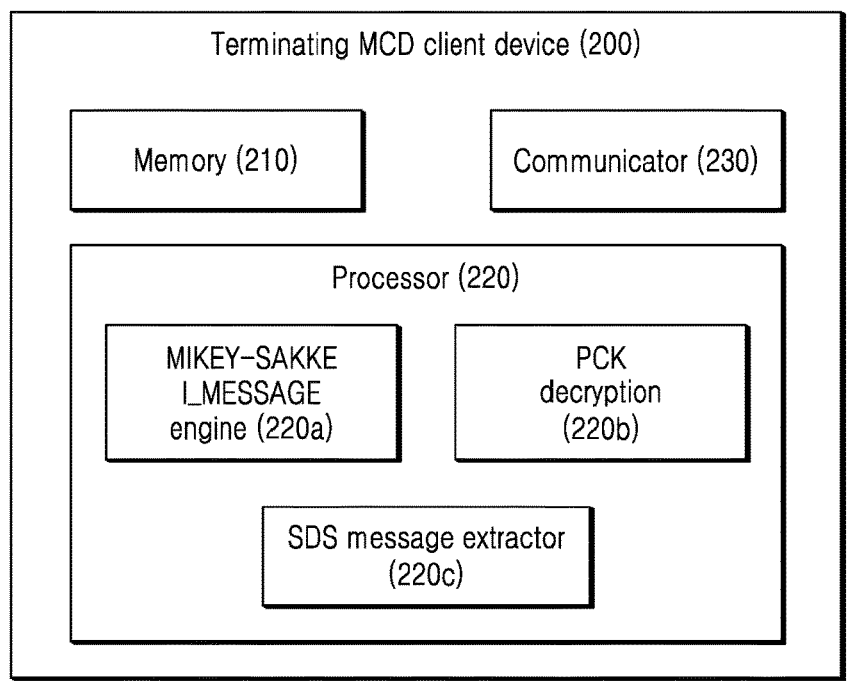

[Fig. 4]
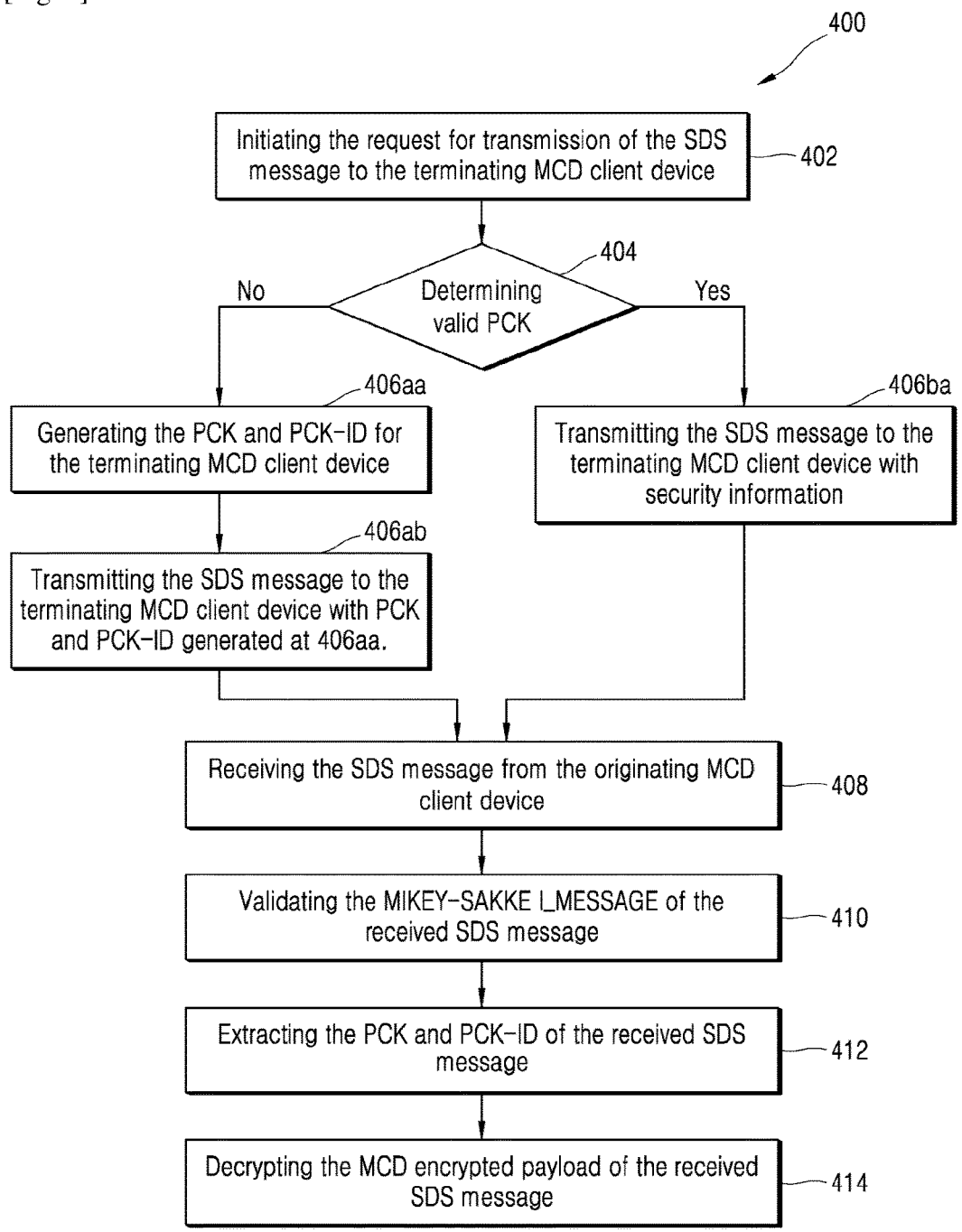
[Fig. 5]
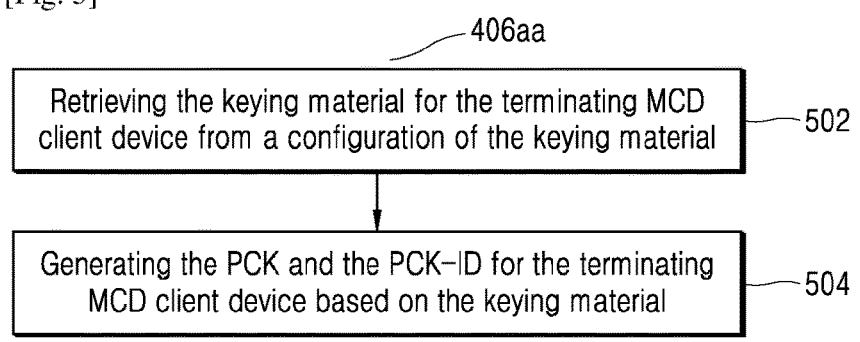

[Fig. 6]
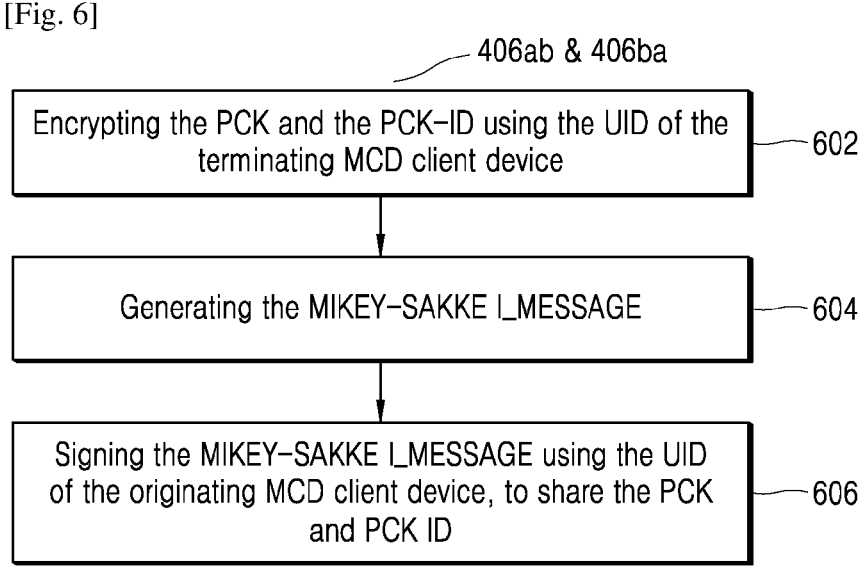

[Fig. 7]
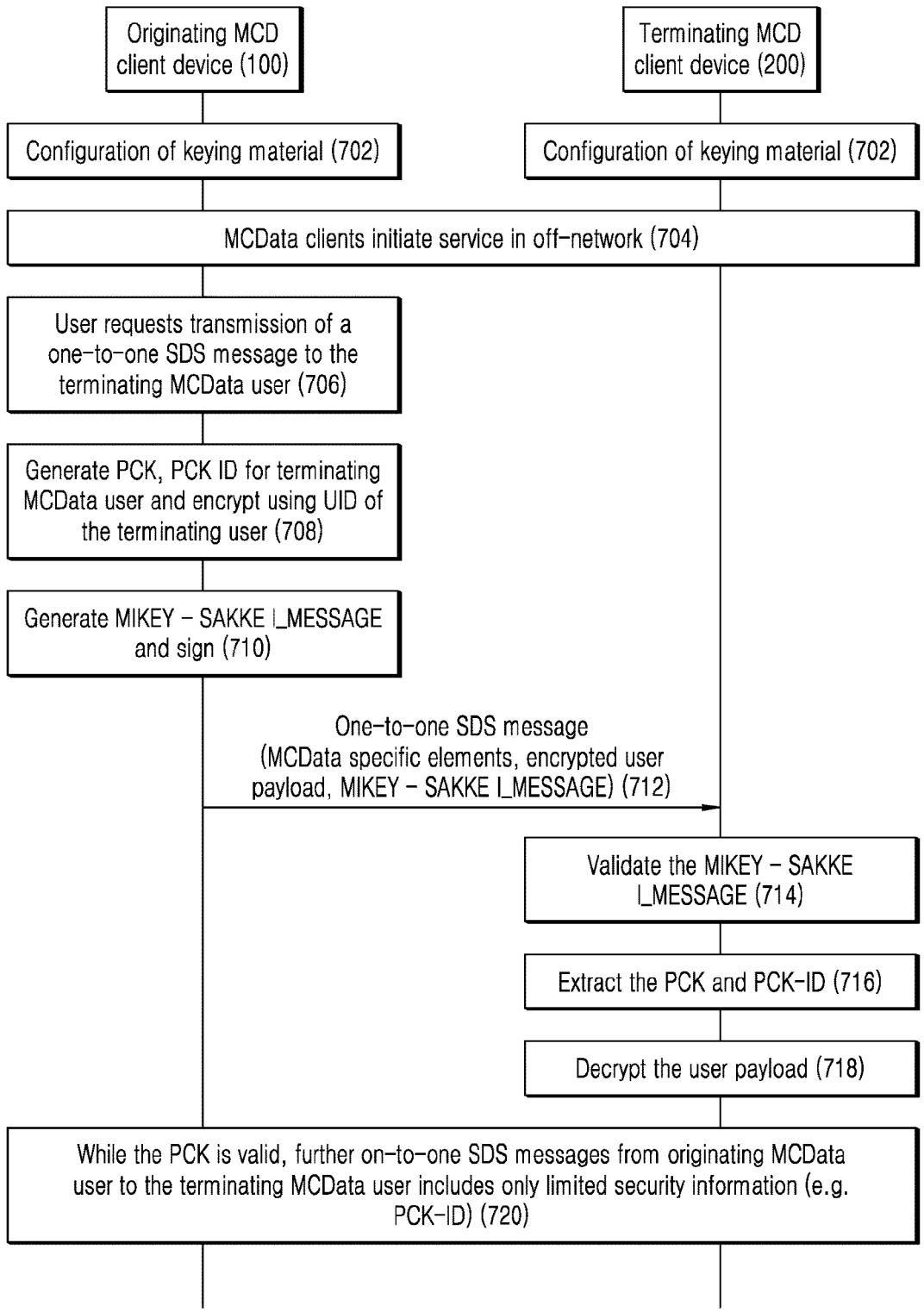

[Fig. 8]
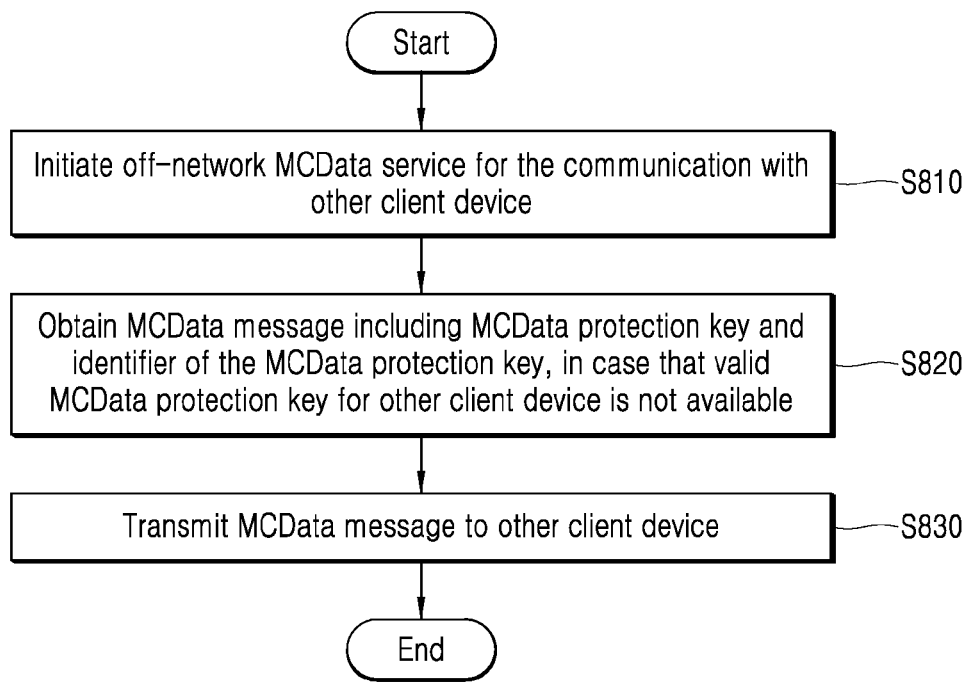

METHOD AND APPARATUS FOR KEY MANAGEMENT IN MISSION CRITICAL DATA COMMUNICATION

TECHNICAL FIELD

The present disclosure relates to a mission-critical systems, more particularly, it is related to a method and apparatus for off-network key management in a one-to-one Mission Critical Data (MCD) communication.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Technical Problem

For off-network communications, the key information sharing (i.e. security context establishment) needs to done prior to electronic devices (e.g. originating user, terminating user, user equipment (UE)) moving to the off-network. This restricts the service scenarios, where the UE initiates service directly in the off-network or moves to the off-network without sharing the key information, cannot use off-network one-to-one MCD communication services.

Solution to Problem

Provided embodiments are methods and apparatuses for off-network key management in a one-to-one Mission Critical Data (MCD) communication.

Another object of the embodiments is to initiate a request for transmission of a short data service (SDS) message to a terminating MCD client device and determine whether a valid private call key (PCK) is available with the originating MCD client for the terminating MCD client device.

Another object of the embodiments is to generate the PCK and a private call key identifier (PCK-ID) for the terminating MCD client device when the valid PCK is not available with the originating MCD client device for the terminating MCD client device, and transmit the SDS message to the terminating MCD client device, where the SDS message comprises MCD service-specific elements, MCD encrypted payload, and the PCK and PCK-ID.

Another object of the embodiments is to transmit the SDS message to the terminating MCD client device, where the SDS message comprises security information when the valid PCK is available with the originating MCD client device for the terminating MCD client device.

BRIEF DESCRIPTION OF DRAWINGS

This method is illustrated in the accompanying drawings, throughout which like reference letters indicate corresponding parts in the various figures. The embodiments herein will be better understood from the following description with reference to the drawing, in which:

FIG. 1 illustrates a method for off-network key management in a one-to-one Mission Critical Data (MCD) communication system, according to an embodiment as disclosed herein;

FIG. 2 illustrates a block diagram of an originating MCD client device for off-network key management in the one-to-one MCD communication, according to an embodiment as disclosed herein;

FIG. 3 illustrates a block diagram of a terminating MCD client device for off-network key management in the one-to-one MCD communication, according to an embodiment as disclosed herein;

FIG. 4 is a flow diagram illustrating the method for off-network key management in the one-to-one MCD communication, according to an embodiment as disclosed herein;

FIG. 5 is a flow diagram illustrating the method for generating a private call key (PCK) and private call key identifier (PCK-ID) for the terminating MCD client device, according to an embodiment as disclosed herein;

FIG. 6 is a flow diagram illustrating the method for transmitting a short data service (SDS) message to the terminating MCD client device, according to an embodiment as disclosed herein; and FIG. 7 is a sequence diagram illustrating the method for off-network key management in the one-to-one MCD communication, according to an embodiment as disclosed herein.

FIG. 8 is a flowchart illustrating a method for an off-network key management in one-to-one mission critical data (MCData) communication by a client device, according to an embodiment as disclosed herein.

BEST MODE FOR CARRYING OUT THE INVENTION

The present application provides a method and an apparatus for for off-network key management in one-to-one mission critical data communication.

Accordingly, embodiments herein disclosed a method and apparatus for off-network key management in a one-to-one Mission Critical Data (MCD) communication. The method includes initiating, by an originating MCD client device, a request for transmission of a short data service (SDS) message to a terminating MCD client device. Further, the method includes determining, by the originating MCD client device, whether a key for the terminating MCD client device (200) is available with the originating MCD client for the terminating MCD client device. Further, the method includes performing, by the originating MCD client device, either generating the key and a key identifier (KEY-ID) for the terminating MCD client device when valid key for the terminating MCD client device is not available with the originating MCD client device, and transmitting the SDS message to the terminating MCD client device or transmitting the SDS message to the terminating MCD client device when valid key for the terminating MCD client device is available with the originating MCD client device.

In an embodiment, generating the key and the KEY-ID for the terminating MCD client device includes retrieving, by the originating MCD client device, a keying material for the terminating MCD client device from a configuration of the keying material. Further, the method includes generating, by the originating MCD client device, the key and the KEY-ID for the terminating MCD client device based on the keying material.

In an embodiment, transmitting the SDS message to the terminating MCD client device includes encrypting, by the originating MCD client device, the key and the KEY-ID using the unique identification (UID) of the terminating MCD client device. Further, the method includes generating, by the originating MCD client device, a MIKEY-SAKKE I_MESSAGE encapsulating the key and the KEY-ID. Further, the method includes signing, by the originating MCD client device, the MIKEY-SAKKE I_MESSAGE using the UID of the originating MCD client device, to share the key and KEY ID. Further, the method includes transmitting, by the originating MCD client device, the SDS message to the terminating MCD client device, where the SDS message comprises the MCD service-specific elements, the MCD encrypted payload comprising the MIKEY-SAKKE I_MESSAGE.

In an embodiment, the key used is private call key (PCK) and the key identifier used is private call key identifier (PCK-ID).

In an embodiment, the configuration of the keying material is configured in the originating MCD client device and the terminating MCD client device during provisioning for the off-network service.

In an embodiment, a time period for which the configuration of the keying material is valid is also configured in the originating MCD client device and the terminating MCD client device during the provisioning for the off-network service.

In an embodiment, the configuration of the keying material is configured in the originating MCD client device and the terminating MCD client device by a Key Management Server while the originating MCD client device and the terminating MCD client device are in on-network service.

In an embodiment, the MCD service-specific elements comprise a message type, a date-time of creation of the MCD encrypted payload, a payload identity, a payload sequence number, and a PCK identifier.

In an embodiment, the security information comprises only the PCK-ID along with the MCD service-specific elements, and the MCD encrypted payload.

In an embodiment, where the security information comprises only the PCK-ID, it can be encapsulated in a MIKEY-SAKKE I_MESSAGE for distribution.

In an embodiment, the method further includes receiving, by the terminating MCD client device, the SDS message from the originating MCD client device. Further, the method includes validating, by the terminating MCD client device, the MIKEY-SAKKE I_MESSAGE of the received SDS message. Further, the method includes extracting, by the terminating MCD client device, the key and KEY-ID from the MIKEY-SAKKE I_MESSAGE of the received SDS message. Further, the method includes decrypting, by the terminating MCD client device, the MCD encrypted payload of the received SDS message.

Accordingly, the embodiments herein provide an originating MCD client device for providing a method for off-network key management in a one-to-one Mission Critical Data (MCD) communication. The originating MCD client device includes a processor and a memory. The processor is configured to initiate a request for transmission of a short data service (SDS) message to a terminating MCD client device. Further, the processor is configured to determine whether a valid key for the terminating MCD client device is available with the originating MCD client. Further, the processor is configured to perform either generate the key and a key identifier (KEY-ID) for the terminating MCD client device when the valid key for the terminating MCD client device is not available with the originating MCD client device, and transmit the SDS message to the terminating MCD client device or transmit the SDS message to the terminating MCD client device when the valid key for the terminating MCD client device is available with the originating MCD client device.

Accordingly, the embodiments herein provide a terminating MCD client device for providing a method for off-network key management in a one-to-one Mission Critical Data (MCD) communication. The terminating MCD client device includes a processor and a memory. The processor is configured to receive the SDS message from the originating MCD client device. Further, the processor is configured to validate the MIKEY-SAKKE I_MESSAGE of the received SDS message. Further, the processor is configured to extract the key and KEY-ID from the MIKEY-SAKKE I_MESSAGE of the received SDS message. Further, the processor is configured to decrypt the MCD encrypted payload of the received SDS message.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Mode for the Invention

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Mission Critical Data (MCD) communication system allows mission-critical users to communicate using data, such as text, files, etc. Encryption (and may also integrity protection/digital signature) is used to secure the communication between the mission-critical users for which key generation material and credentials between the mission-critical users are provided by a key management server securely. A media plane security context is used to secure the communication between the mission-critical users (i.e. end-users). The media plane security context needs to be established prior to the communication. While in off-network, the media plane security context establishment is a cumbersome procedure and should be avoided, especially for small user payloads such as short data service (SDS) of MCD communications.

For one-to-one (private) MCD communications an originating user generates a key for encryption and provides the key to use along with the key identification information to a terminating user. For off-network communications, according to current 3rd Generation Partnership Project (3GPP) standards (i.e. Release 15), the key information sharing (i.e. security context establishment) needs to done prior to electronic devices (e.g. originating user, terminating user, user equipment (UE)) moving to the off-network. This restricts the service scenarios, where the UE initiates service directly in the off-network or moves to the off-network without sharing the key information, cannot use off-network one-to-one MCD communication services.

Thus, it is desired to address the above mentioned disadvantages or other shortcomings or at least provide a useful alternative.

Accordingly, embodiments herein disclosed a method and apparatus for off-network key management in a one-to-one Mission Critical Data (MCD) communication. The method includes initiating, by an originating MCD client device, a request for transmission of a short data service (SDS) message to a terminating MCD client device. Further, the method includes determining, by the originating MCD client device, whether a valid private call key (PCK) is available with the originating MCD client for the terminating MCD client device. Further, the method includes performing, by the originating MCD client device, either generating the PCK and a private call key identifier (PCK-ID) for the terminating MCD client device when valid PCK is not available with the originating MCD client device for the terminating MCD client device, and transmitting the SDS message to the terminating MCD client device or transmitting the SDS message to the terminating MCD client device when valid PCK is available with the originating MCD client device for the terminating MCD client device.

Referring now to the drawings, and more particularly to FIG. 1 through 7, where similar reference characters denote corresponding features consistently throughout the figures, there are shown preferred embodiments.

FIG. 1 illustrates a method for off-network key management in a one-to-one Mission Critical Data (MCD) communication system (1000), according to an embodiment as disclosed herein. The MCD communication includes an originating MCD client device (100) and a terminating MCD client device (200). The originating MCD client device (100) and the terminating MCD client device (200) can be, for example, but not limited to a smartphone, a laptop, a desktop, a smartwatch and the like.

In an embodiment, the originating MCD client device (100) is configured to initiate a request for transmission of a short data service (SDS) message to the terminating MCD client device (200). Further, the originating MCD client device (100) is configured to determine whether a valid private call key (PCK) is available with the originating MCD client device (100) for the terminating MCD client device (200). Further, the originating MCD client device (100) is configured to either generate the PCK and a private call key identifier (PCK-ID) for the terminating MCD client device (200) when the valid PCK is not available, and transmit a short data service (SDS) message to the terminating MCD client device (200), where the SDS message comprises MCD service-specific elements, MCD encrypted payload, and the PCK and PCK-ID encapsulated in a MIKEY-SAKKE I_MESSAGE; or transmit the SDS message to the terminating MCD client device (200), where the SDS message comprises MCD service-specific elements, MCD encrypted payload, and security information.

In an embodiment, the originating MCD client device (100) is configured to retrieve a keying material for the terminating MCD client device (200) from a configuration of the keying material. Further, the originating MCD client device (100) is configured to generate the PCK and the PCK-ID for the terminating MCD client device (200) based on the keying material.

In an embodiment, the originating MCD client device (100) is configured to encrypt the PCK and the PCK-ID using the UID of the terminating MCD client device (200). Further, the originating MCD client device (100) is configured to generate a Sakai-Kasahara Key Encryption in Multimedia Internet KEYing MIKEY-SAKKE I_MESSAGE. Further, the originating MCD client device (100) is configured to sign the MIKEY-SAKKE I_MESSAGE using the UID of the originating MCD client device (100), to share the PCK and PCK ID. Further, the originating MCD client device (100) is configured to transmit the SDS message to the terminating MCD client device (200), where the SDS message comprises the MCD service-specific elements, the MCD encrypted payload comprising the MIKEY-SAKKE I_MESSAGE encapsulating the encrypted PCK and the encrypted PCK-ID.

In an embodiment, the terminating MCD client device (200) is configured to receive the SDS message from the originating MCD client device (100). Further, the terminating MCD client device (200) is configured to validate the MIKEY-SAKKE I_MESSAGE of the received SDS message. Further, the terminating MCD client device (200) is configured to extract the PCK and PCK-ID from the MIKEY-SAKKE I_MESSAGE of the received SDS message. Further, the terminating MCD client device (200) is configured to decrypt the MCD encrypted payload of the received SDS message.

FIG. 2 illustrates a block diagram of the originating MCD client device (100) for off-network key management in the one-to-one MCD communication, according to an embodiment as disclosed herein. The originating MCD client device (100) includes a memory (110), a processor (120), and a communicator (130).

The memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the originating MCD client device (100), a cloud storage, or any other type of external storage.

The processor (120) is configured to execute instructions stored in the memory (110) and to perform various processes. The processor (120) includes a PCK engine (120a), a PCK encryption (120b), a MIKEY-SAKKE I_MESSAGE engine (120c), and a SDS message generator (120d).

In an embodiment, the PCK engine (120a) determines whether the valid PCK is available with the originating MCD client device (100) for the terminating MCD client device (200). Further, the PCK engine (120a) generates the PCK and the PCK-ID for the terminating MCD client device (200) based on the keying material when the valid PCK is not available with the originating MCD client device (100) for the terminating MCD client device (200). Further, the PCK engine (120a) retrieves the keying material for the terminating MCD client device (200) from the configuration of the keying material.

In an embodiment, the PCK encryption (120b) encrypts the PCK and the PCK-ID using the UID of the terminating MCD client device (200).

In an embodiment, the MIKEY-SAKKE I_MESSAGE engine (120c) generates the MIKEY-SAKKE I_MESSAGE. Further, the MIKEY-SAKKE I_MESSAGE engine (120c)

signs the MIKEY-SAKKE I_MESSAGE using the UID of the originating MCD client device (100), to share the PCK and PCK ID.

In an embodiment, the SDS message generator (120*d*) initiates the request for transmission of the SDS message to the terminating MCD client device (200). Further, the SDS message generator (120*d*) transmits the SDS message to the terminating MCD client device (200).

The communicator (130) is configured for communicating internally between internal hardware components and with external devices via one or more networks.

Although the FIG. 2 shows various hardware components of the originating MCD client device (100) but it is to be understood that other embodiments are not limited thereon. In other embodiments, the originating MCD client device (100) may include less or more number of components. Further, the labels or names of the components are used only for illustrative purpose and does not limit the scope of the invention. One or more components can be combined together to perform same or substantially similar function for off-network key management in the one-to-one MCD communication.

FIG. 3 illustrates a block diagram of the terminating MCD client device (200) for off-network key management in the one-to-one MCD communication, according to an embodiment as disclosed herein. The terminating MCD client device (200) includes a memory (210), a processor (220), and a communicator (230).

The memory (210) also stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache). The memory (210) can be an internal storage unit or it can be an external storage unit of the terminating MCD client device (200), a cloud storage, or any other type of external storage.

The processor (220) is configured to execute instructions stored in the memory (210) and to perform various processes. The processor (220) includes a MIKEY-SAKKE I_MESSAGE engine (220*a*), a PCK decryption (220*b*), and a SDS message extractor (220*c*).

In an embodiment, the MIKEY-SAKKE I_MESSAGE engine (220*a*) validates the MIKEY-SAKKE I_MESSAGE message of the received SDS message. The PCK decryption (220*b*) extracts the PCK and PCK-ID from the MIKEY-SAKKE I_MESSAGE of the received SDS message. Further, the PCK decryption (220*b*) decrypts the MCD encrypted payload of the received SDS message. The SDS message extractor (220*c*) receives the SDS message from the originating MCD client device (100).

The communicator (230) is configured for communicating internally between internal hardware components and with external devices via one or more networks.

Although the FIG. 3 shows various hardware components of the terminating MCD client device (200) but it is to be understood that other embodiments are not limited thereon. In other embodiments, the terminating MCD client device (200) may include less or more number of components. Further, the labels or names of the components are used only for illustrative purpose and does not limit the scope of the invention. One or more components can be combined together to perform same or substantially similar function for off-network key management in the one-to-one MCD communication.

FIG. 4 is a flow diagram (400) illustrating the method for off-network key management in the one-to-one MCD communication, according to an embodiment as disclosed herein. The operations (402-406*ab*) and (402-406*ba*) are performed by the originating MCD client device (100). The operations (408-414) are performed by the terminating MCD client device (200).

At 402, the method includes initiating the request for transmission of the SDS message to the terminating MCD client device (200). At 404, the method includes determining valid PCK. At 406*aa*, the method includes generating the PCK and PCK-ID for the terminating MCD client device (200). At 406*ab*, the method includes transmitting the SDS message to the terminating MCD client device (200) with the PCK and PCK-ID generated at step 406*aa* and encapsulated in the MIKEY-SAKKE I_MESSAGE. At 406*ba*, the method includes transmitting the SDS message to the terminating MCD client device (200) with security information.

At 408, the method includes receiving the SDS message from the originating MCD client device (100). At 410, the method includes validating the MIKEY-SAKKE I_MESSAGE of the received SDS message. At 412, the method includes extracting the PCK and PCK-ID from the MIKEY-SAKKE I_MESSAGE of the received SDS message. At 414, the method includes decrypting the MCD encrypted payload of the received SDS message.

FIG. 5 is a flow diagram (406*aa*) illustrating the method for generating the PCK and the PCK-ID for the terminating MCD client device (200), according to an embodiment as disclosed herein.

At 502, the method includes retrieving the keying material for the terminating MCD client device (200) from a configuration of the keying material. At 504, the method includes generating the PCK and the PCK-ID for the terminating MCD client device (200) based on the keying material.

FIG. 6 is a flow diagram (406*ab* and 406*ba*) illustrating the method for transmitting the SDS message to the terminating MCD client device (200), according to an embodiment as disclosed herein.

At 602, the method includes encrypting the PCK and the PCK-ID using the UID of the terminating MCD client device (200). At 604, the method includes generating the MIKEY-SAKKE I_MESSAGE. At 606, the method includes signing the MIKEY-SAKKE I_MESSAGE using the UID of the originating MCD client device (100), to share the PCK and PCK ID.

FIG. 7 is a sequence diagram (700) illustrating the method for off-network key management in the one-to-one MCD communication, according to an embodiment as disclosed herein.

To avoid establishment of media sessions for communication on signalling plane while in off-network, the proposed method suggests to generate and share the communication protection keys (e.g. PCK) with the user payload on the signalling plane.

At step 702, the keying material (including: a user signing key for each UID, a user decryption key for each UID, the key period number associated with the current keys) is configured in the devices (i.e. the originating MCD client device (100) and the terminating MCD client device (200)) during provisioning for off-network. Optionally, the time period, for which the user key material is valid (e.g. month) is also configured in the device during provisioning for off-network. The keying material is different for each user the originating MCData user is allowed to contact while off-network. The keying material can be configured in the device by the Key Management Server while it is on-network or through offline methods.

At step-704, the MCData devices initiate the off-network MCData service for off-network communications. At step-706, the MCData user on the originating MCD client device (100) initiates the one-to-one SDS message to the terminating MCData user of the terminating MCD client device (200).

At step-708, if valid private call key (PCK) is not available with the originating MCD client device (100) for the terminating MCD client device (200), then the originating MCD client device (100) retrieves the keying material for the terminating MCD client device (200) from the configuration and generates the PCK and private call key identifier (PCK-ID) for the terminating MCD client device (200). The PCK and PCK-ID are encrypted using the UID of the terminating MCD client device (200).

At step-710, the originating MCD client device (100) generates the MIKEY-SAKKE I_MESSAGE encapsulating the PCK and PCK-ID, and signs the MIKEY-SAKKE I_MESSAGE using the originating MCD client device (100)'s UID, to share the PCK and PCK ID.

At step-712, the originating MCD client device (100) generates and sends the one-to-one SDS message towards the terminating MCD client device (200). The one-to-one SDS message includes the MCData service-specific elements, such as conversation identifier, etc., user payload encrypted using the PCK generated in step-708 and the MIKEY-SAKKE I_MESSAGE generated in step-710.

At step-714, upon receiving the SDS message, the terminating MCD client device (200) validates the MIKEY-SAKKE I_MESSAGE using the IDRi element of the MIKEY-SAKKE I_MESSAGE and the configured UID of the originating MCD client device (100). At step-716, upon successful validation of the MIKEY-SAKKE I_MESSAGE, the terminating MCD client device (200) extracts the PCK and PCK-ID from the MIKEY-SAKKE I_MESSAGE.

At step-718, using the extracted PCK and PCK-ID, the terminating MCD client device (200) decrypts the user (i.e. the originating MCD client device (100)) payload and presents it to the MCData user. At step-720 while the PCK generated in step-708 is valid, further one-to-one SDS messages from the originating MCData user of the originating MCD client device (100) to the terminating MCData user of the terminating MCD client device (200) includes limited security information, for e.g. only the PCK-ID, along with the MCData specific elements and the encrypted user payload, and do not require the complete MIKEY-SAKKE I_MESSAGE.

The optimization described in step-720 can also be used while in network coverage to significantly reduce the message sizes. The keying material, being specific to each user that can be communicated in one-to-one mission-critical communication, can be stored as a user profile configuration of the originating users (e.g. originating MCD client device (100)). In protocol implementations for off-network communications, the generated MIKEY-SAKKE I_MESSAGE can be transmitted as a TLV-E information element along with the MCData specific elements and protected user payload using the MONP protocol used by Mission Critical services.

The key and the key identifier, PCK and PCK-ID are used as illustrative examples in this invention. In an alternate embodiment, a different encryption key and key identifier can be used.

FIG. 8 is a flowchart illustrating a method for an off-network key management in one-to-one mission critical data (MCData) communication by a client device, according to an embodiment as disclosed herein.

In operation S810, the client device initiates an off-network MCData service for the communication with an other client device. The client device may correspond to the aforementioned originating MCD client device.

In operation S820, the client device obtains a MCData message including a MCdata protection key and an identifier of the MCdata protection key, in case that a valid MCdata protection key for the other client device is not available. The MCData message may correspond to the aforementioned SDS message. According to another embodiment, in case that the valid MCdata protection key for the other client device is available, the client device may transmit the MCData message without the MCdata protection key In operation S830, the client device transmits the MCData message to the other client device. The other client device may correspond to the aforementioned terminating MCD client device.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for off-network key management in one-to-one mission critical data (MCData) communication by a first client device, the method comprising:
   initiating, by the first client device, an off-network MCData service for the one-to-one MCData communication with a second client device;
   based on not having a valid private call key (PCK) for the second client device, obtaining, by the first client device, an MCData message including a PCK in a TLV-E format, and an identifier (ID) of the PCK; and
   transmitting the MCData message to the second client device.

2. The method of claim 1, wherein the MCData message includes a message type, a payload identity, a payload sequence number, a date-time of creation of an encrypted payload, the ID of the PCK, and an MIKEY-SAKKE I-message in the TLV-E format.

3. The method of claim 2, wherein the PCK is encapsulated within the MIKEY-SAKKE I-message included in the MCData message.

4. The method of claim 1, further comprising:
   based on having the valid PCK for the second client device, transmitting the MCData message without the PCK to the second client device.

5. The method of claim 4, wherein the MCData message includes a message type, a payload identity, a payload sequence number, a date-time of creation of an encrypted payload, and the ID of the PCK.

6. The method of claim 1, wherein a keying material is provided in the first client device and the MCData message including the PCK is obtained based on the keying material.

7. The method of claim 6, wherein a validity of the keying material is time-limited.

8. A first client device for off-network key management in one-to-one mission critical data (MCData) communication, the first client device comprising:
   a transceiver; and
   at least one processor coupled with the transceiver and configured to:
      initiate an off-network MCData service for the one-to-one MCData communication with a second client device,
      based on not having a valid private call key (PCK) for the second client device, obtain an MCData message including a PCK in a TLV-E format, and an identifier (ID) of the PCK, and
      control the transceiver to transmit the MCData message to the second client device.

9. The first client device of claim 8, wherein the MCData message includes a message type, a payload identity, a payload sequence number, a date-time of creation of an encrypted payload, the ID of the PCK, and an MIKEY-SAKKE I-message in the TLV-E format.

10. The first client device of claim 9, wherein the PCK is encapsulated within the MIKEY-SAKKE I-message included in the MCData message.

11. The first client device of claim 8, wherein the at least one processor is further configured to:
   based on having the valid PCK for the second client device, control the transceiver to transmit the MCData message without the PCK to the second client device.

12. The first client device of claim 11, wherein the MCData message includes a message type, a payload identity, a payload sequence number, a date-time of creation of an encrypted payload, and the ID of the PCK.

13. The first client device of claim 8, wherein a keying material is provided in the first client device and the MCData message including the PCK is obtained based on the keying material.

* * * * *